United States Patent Office 3,524,509
Patented Aug. 18, 1970

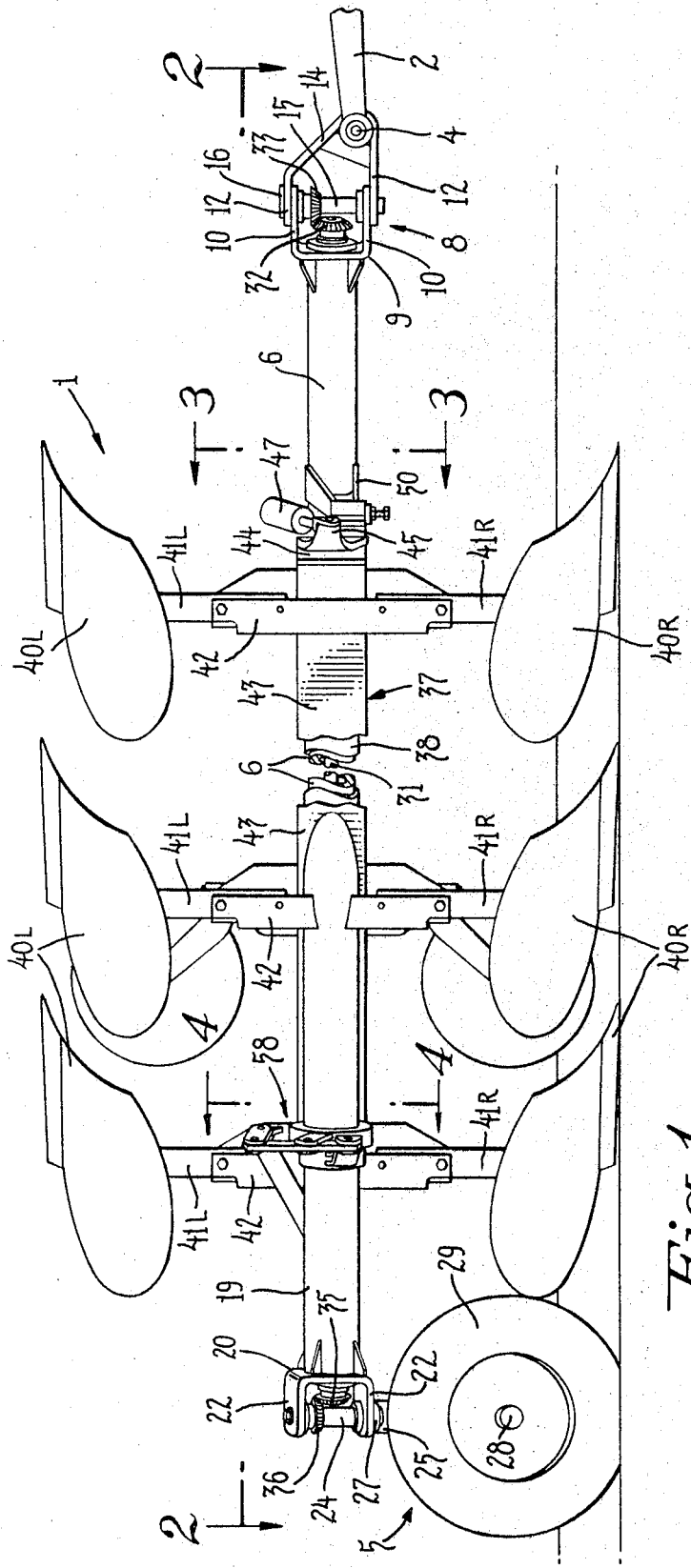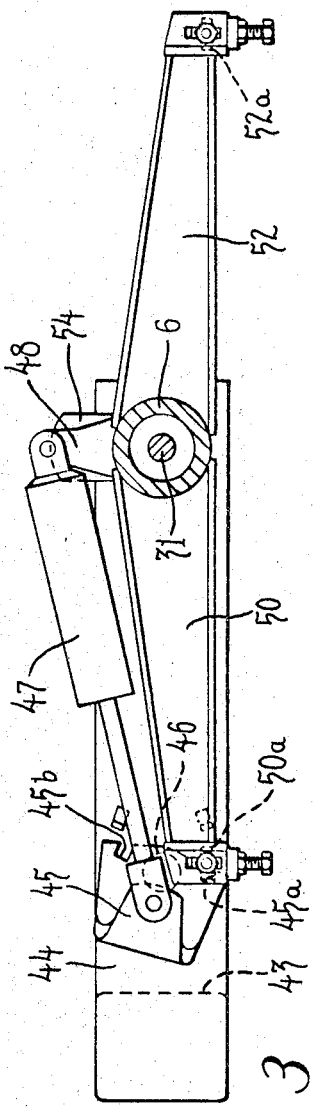

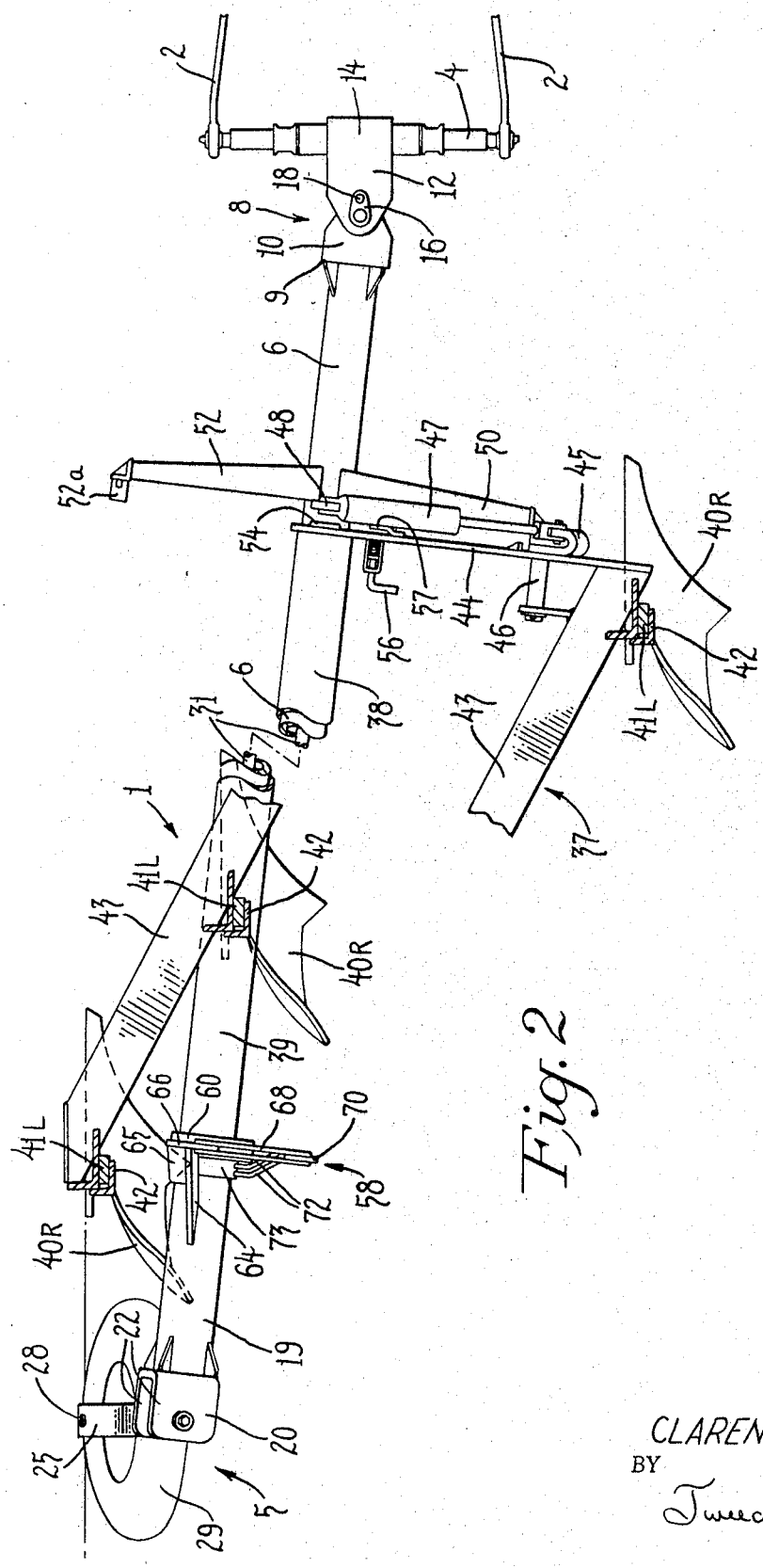

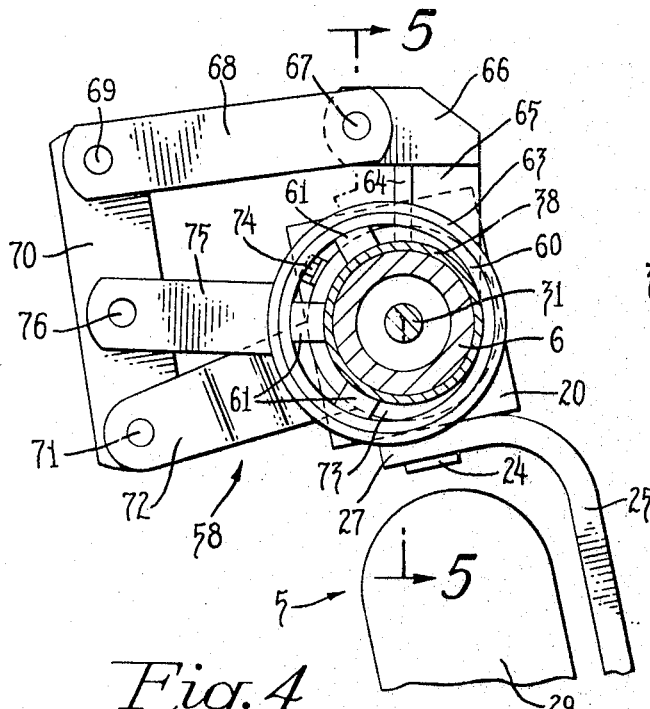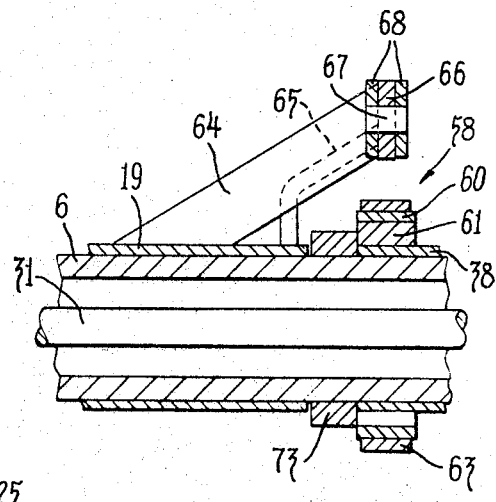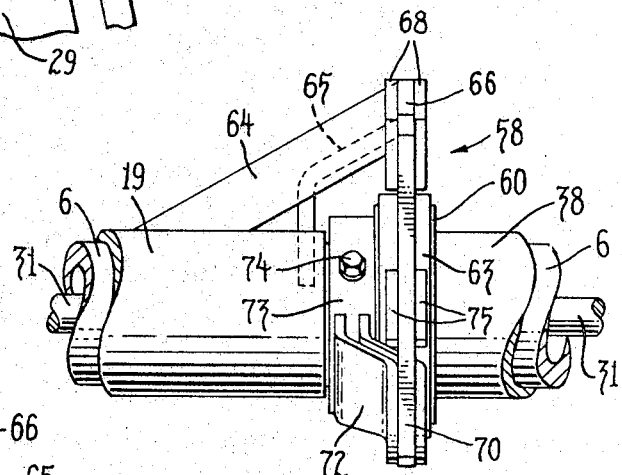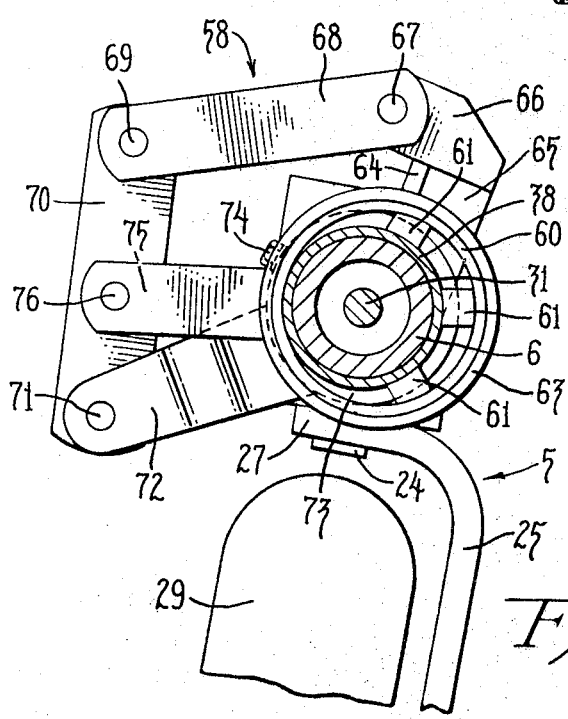

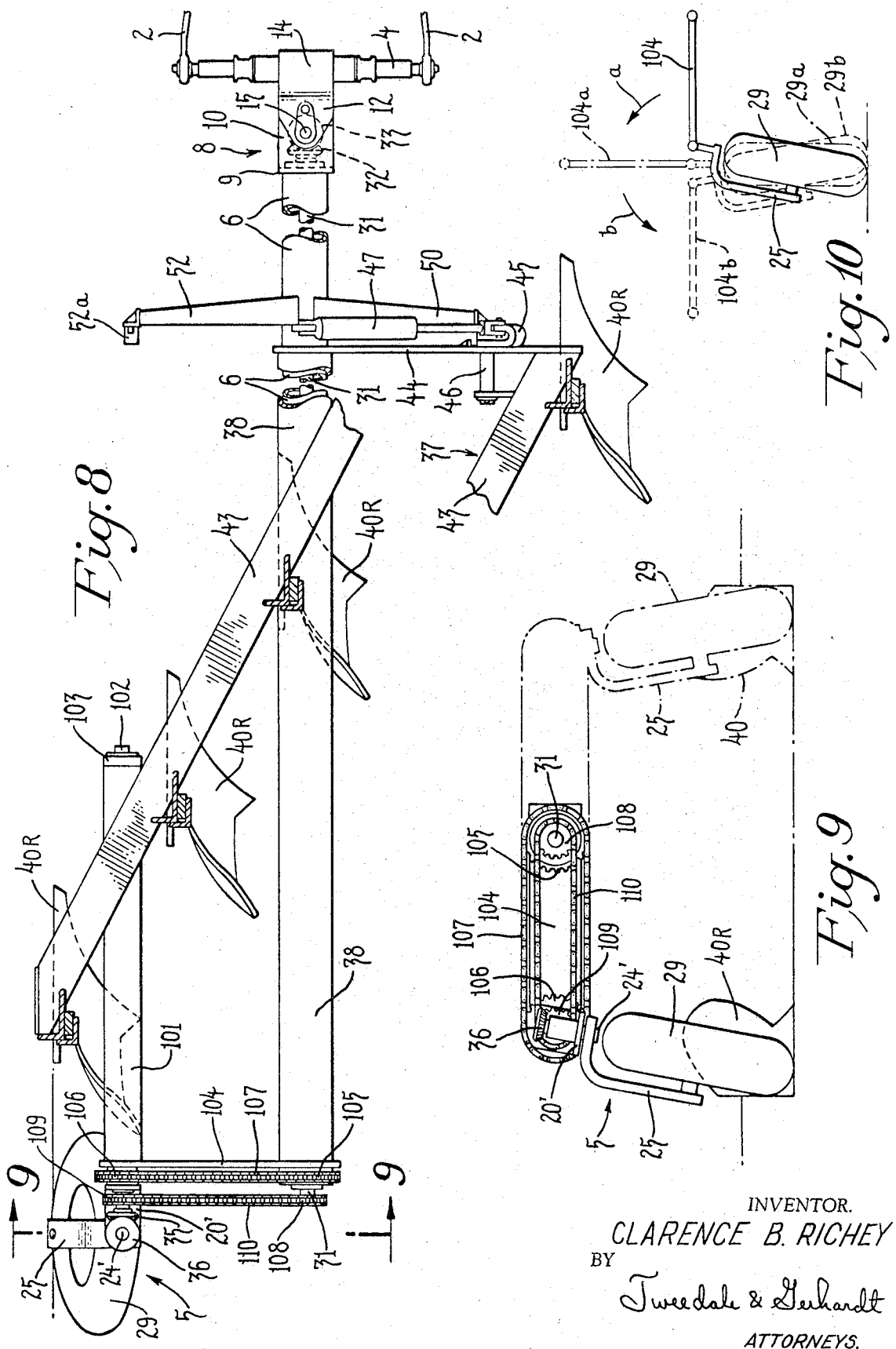

3,524,509
SEMI-MOUNTED EARTHWORKING IMPLEMENT
Clarence B. Richey, Fresno, Calif., assignor to
Massey-Ferguson Inc., Detroit, Mich.
Filed Feb. 1, 1966, Ser. No. 524,191
Int. Cl. A01b 3/34, 69/08
U.S. Cl. 172—212      4 Claims

ABSTRACT OF THE DISCLOSURE

A multi-bottom turnover plowing implement has a longitudinal tube forming its main frame to be supported at one end by a tractor hitch linkage and at its rear end by a tail wheel for constant height above the furrow bottom when plowing and above the land when in transport. Two arrays of plows of opposite hand are mounted on a carrier comprising another tube telescoped over the frame tube. Means are provided to steer the tail wheel as the tractor turns and to tilt the tail wheel as the carrier is turned over.

---

This invention relates generally to tractor drawn implements of the type wherein a portion of the implement weight is supported by the tractor hitch and the remaining portion of the implement weight is supported by a ground wheel mounted on the implement, and is particularly concerned with semi-mounted reversible and turnover plows having alternate transport and working positions.

It has been conventional to mount multiple-bottom plows on the hydraulic hitch of tractors such that when the plow bottoms are not in engagement with the ground, the entire weight of the implement is carried by the hydraulic hitch linkage of the tractor. As the pulling power and size of tractors has increased, the tractor lifting and transporting capacity has become the factor limiting plow size rather than the drawbar pull capacity of the tractor.

Consequently, there is now a growing demand for semi-mounted implements of this type in which a portion of the weight of the implement is carried independently of the tractor hitch by a ground wheel or the like which is usually mounted at the rear end of the implement. Presently available implements of this type have tail wheels that must be raised and lowered with respect to the implement as the implement is moved between its working and transport positions, respectively, by the tractor hitch. The steering controls for steering the tail wheel of such implements are complex and expensive. While the need for suitable semi-mounted one-way plows has increased, there has been an even greater need for a suitable semi-mounted two-way plow wherein right-hand and left-hand plow bottoms may be selectively moved into plowing positions, and for efficient operation, a furrow wheel is required to counteract the lateral soil forces acting on the plow bottoms.

In accordance with the preferred embodiment of the present invention, at least one plow bottom or similar tool is mounted on an implement frame member for selective movement between an operative ground engaging position and an inoperative transport position, with the forward end of the frame supported on a draft vehicle. A wheel or other ground support means is provided for supporting the rear of the implement and is mounted in such a manner that it may be inclined in a direction to resist lateral forces acting on the plow bottom when the plow bottom is in its operative position, and may be positioned vertically when the plow is in its transport position.

A feature of the invention is the provision of wheel tilting mechanism interconnecting the wheel and plow for actuating the wheel between its inclined furrow wheel position and vertical, transport position in response to movement of the plow between its operative and transport positions, respectively.

In addition, the forward end of the implement may be supported on the draft vehicle for side to side swinging movement about the axis of a spindle in response to changes in the direction of travel of the draft vehicle, and a steering control rod extends through a draft frame member to the wheel with its ends geared to the spindle and rear wheel assembly in such a manner that the wheel is steered in accordance with changes in the direction of the vehicle.

Preferably a turnover plow including a plurality of oppositely projecting right and left-hand plow bottoms is mounted on the implement frame and connected with the tail wheel such that the wheel tilts in opposite directions as the plow bottoms are rotated 180 degrees to plow in opposite directions so that the wheel counteracts the side forces acting on the plow bottoms in either direction of plowing, and moves to a vertical position when the plow bottoms rotate 90 degrees from either of the operating positions for transport.

Other objects, features and advantages of the invention will become apparent from the following description taken in connection with the accompanying drawings in which:

FIG. 1 is an elevational view of a two-way turnover plow embodying the invention in its preferred form;

FIG. 2 is a sectional plan view taken on lone 2—2 of FIG. 1;

FIG. 3 is a sectional view taken on line 3—3 of FIG. 1;

FIG. 4 is a detail view of the tilting mechanism taken on line 4—4 of FIG. 1;

FIG. 5 is a sectional view taken on line 5—5 of FIG. 4;

FIG. 6 is a detailed view similar to FIG. 5;

FIG. 7 is a view similar to FIG. 4 with the wheel tilted in the opposite direction;

FIGS. 8 and 9 are plan and end views, respectively, of a modified implement according to the invention; and FIG. 10 is a schematic end view of the implement of FIGS. 8 and 9 illustrating the successive movement of the implement between opposite working and transport positions.

In FIGS. 1 and 2, reference numeral 1 collectively designates an implement in the form of a two-way, turnover plow connected at its forward end with a cross bar 4 mounted between the trailing ends of the lower draft links 2 of a tractor (not shown) having a conventional three-point, hydraulic hitch. The rear end of implement 1 is supported on a wheel or ground support assembly 5.

Implement 1 includes an elongated draft frame member 6 preferably of tubular construction on which is mounted a forward connecting assembly 8 including a C-shaped bracket 9 having vertically spaced arms 10. The arms 10 of bracket 9 are received between the ends of a pair of vertically spaced arms 12 of a frame member 14 mounted on cross bar 4. Arms 10 and 12 are pivotally connected together by a pin or spindle 15 carried by arms 12. Spindle 15 is non-rotatably secured to frame 14 by a plate 16 at its upper end which is connected by a screw or bolt 18 to the upper arm 12 as shown in FIG. 2.

The wheel assembly 5 is mounted on a bracket 20 secured to the rear of a sleeve 19 which in turn is rotatably mounted on draft frame member 6. Bracket 20 is formed with vertically spaced, rearwardly projecting arms 22. A spindle 24 is rotatably mounted on arms 22, and the shaft 28 of a ground wheel 29 is mounted on an arm 25 having its upper end 27 non-rotatably secured to the lower end of spindle 24. Rotation of spindle 24 in arms 22 of bracket 20 causes wheel 29 to turn about the axis of spindle 24.

Wheel 29 is caused to turn about the axis of spindle 24 in accordance with changes in direction of the draft vehicle by motion transmitting means in the form of a control rod 31, concentrically journalled within draft frame member 6. A beveled pinion gear 32 is mounted on control rod 31 at its forward end and is engaged with a beveled pinion 33 non-rotatably mounted on spindle 15. Mounted on the rear end of control rod 31 is a beveled pinion gear 35 which is engaged with a beveled pinion 36 non-rotatably mounted on spindle 24. As draft frame member 6 swings to either side of the longitudinal axis of the tractor about the axis of spindle 15, control rod 31 is caused to rotate by movement of pinion 32 around pinion 33, which motion is transmitted to spindle 24 through gears 35 and 36 and cause wheel 29 to turn about the axis of spindle 24 in accordance with changes in the direction of the tractor. The gearing is so arranged that, considering the implement in plan view, when the tractor is steered toward one side, the ground wheel is steered toward the opposite side, thus shortening the turning radius of the tractor-implement combination and assisting in maneuvering when backing up.

Draft frame member 6 carries a frame 37 for supporting plow bottoms or similar earthworking tools. Frame 37 is supported on draft frame member 6 by means of a sleeve 38 concentrically mounted on draft frame member 6.

A plurality of oppositely projecting left and right-hand plow bottoms 40L and 40R, respectively, are mounted on a beam 43 secured intermediate its ends to sleeve 38. The plow bottoms 40L and 40R have standards 41L and 41R, respectively, which are secured to mounting plates 42. A transverse frame member 44 connects the forward end of beam 43 with the forward end of sleeve 38 as shown in FIG. 2. In FIG. 1, the lower plows 40R are in their working position and the moldboards of plows 40R move dirt toward the right of the direction of travel as viewed in FIG. 2. When the tractor reaches the end of the field and turns around, beam 43 is rotated 180 degrees about the common axis of draft frame member 6 and sleeve 38 to move plows 40R to the upper position formerly occupied by plows 40L, and plows 40L engage the ground. For transport, the beam 43 and sleeve 38 is rotated 90 degrees about draft frame member 6 from the position shown in FIG. 1 with the result that both sets of plows 40L and 40R project laterally from sleeve 38 out of engagement with the ground.

The mechanism for moving the plows between the transport and opposite working positions may include a hydraulic ram 47 (FIG. 3), the cylinder of which is pivotally mounted on an arm 48 projecting upwardly from draft frame member 6, and the piston rod of which is pivotally connected with a locking member 45. Locking member 45 is mounted on a shaft 46 rotatably supported in frame member 44. Projecting transversely in opposite directions from draft frame 6 are arms 50 and 52 having locking lugs 50a and 52a, respectively, which are alternately engageable by notches 45a and 45b formed in locking member 45. In the position shown in FIGS. 2 and 3, notch 45a of locking member 45 is engaged with the locking lug 50a. Retraction of the hydraulic ram 47 causes locking member 45 to be disengaged from lug 50a releasing frame member 44 from arm 50 and causing the frame member 44 and beam 43 to be rotated in a clockwise direction about the axis of frame 6 as the ram is retracted. As the locking member 45 and frame member 44 move over the top dead center (i.e., after 90 degrees of clockwise rotation from the position shown in FIG. 3) the ram is extended to cause the frame to continue to move in a clockwise direction until notch 45b of locking member 45 can be brought into engagement with locking lug 52a to position the opposite set of plows into engagement with the ground. When the locking member 45 is in its top dead center position after 90 degrees of clockwise movement from FIG. 3, both sets of plows extend transversely from the longitudinal axis of draft frame member 6 in their transport position, and a transport lock 56 on frame member 44 is in line with an arm 54 (FIG. 2), projecting upwardly from draft frame member 6. Transport lock 56 cooperates with arm 54 and an apertured lug 57 on frame member 44 to secure the plows in their transport position.

With the plow bottoms in the position shown in FIGS. 1 and 2, the ground support assembly is disposed such that wheel 29 lies in an inclined plane and runs in the furrow formed by the trailing plow bottom 40R to act as a furrow wheel and react against the soil forces acting on the plow bottoms 40R that tend to shift the implement in a clockwise direction about spindle 15 as viewed in FIG. 2. When ram 47 is actuated to reverse the direction of the plowing such that the plow bottoms 40L are in engagement with the ground with the plow bottoms 40R projecting upwardly out of engagement with the ground, wheel 29 and arm 25 is shifted over to the position shown in FIG. 7 to react against the side forces acting on plows 40L. This tilting motion of arm 25 and sleeve 19 around the steering control shaft 31 also turns the spindle 24 to steer the ground wheel into a position which compensates for the steering angle introduced when the main frame 6 shifts from one side to the other as is caused by the side draft of the plows when they enter the soil. That steering angle is introduced in the opposite direction to what is required to keep the ground wheel running parallel to the line of travel. Consequently, the tilting motion of the sleeve 19 about the main frame tube 6 is utilized to offset it. When the plow bottoms are moved 90 degrees from either the working position of bottom 40L or 40R to the transport position, wheel 29 lies in a vertical plane midway between the positions of FIGS. 4 and 7 to act as a transport wheel and the ground wheel 29 is steered to straight ahead position.

The mechanism for tilting wheel 29 to either of its opposite furrow wheel positions or its transport position in response to rotation of the frame 37 is shown in detail in FIGS. 4 through 7 and is designated generally by reference numeral 58. The wheel tilting mechanism 58 includes an eccentric 60 mounted on sleeve 38 by a plurality of radial spacers 61 of varying lengths. Concentrically mounted on eccentric 60 is a collar 63. A lever 66 is connected with sleeve 19 by a lever arm 64 and brace member 65. Lever arm 64 and brace member 65 are mounted on sleeve 19 and accordingly, rotation of lever 66 about the axis of draft frame 6 causes corresponding rotation of sleeve 19. Lever 66 is pivotally connected to one end of a double link 68 by a pin 67, and the other end of link 68 is pivotally connected by a pin 69 with one end of a lever 70. Lever 70 has its other end pivotally connected by a pin 71 with a double arm member 72 which is mounted on and projects radially from a cylindrical spacer 73 non-rotatably secured to the draft frame member 6 by a set screw 74. Projecting radially from collar 63 is an actuating arm 75 having its outer end pivotally connected by a pin 76 with lever 70 intermediate its ends.

Arm 72 is held stationary with respect to sleeve 38 due to its connection with spacer 73; hence lever 70 can only move pivotally about pin 71. Since collar 63 is connected with lever 70 through actuating arm 75, the collar 63 cannot rotate with eccentric 60. Therefore, rotation of sleeve 38 through an angle of 180 degrees from the position of FIG. 4 causes eccentric 60 to rotate within collar 63 which results in collar 63 shifting transversely to the right as viewed in FIG. 4 to assume the position of FIG. 7. The latter movement causes actuating arm 75 to shift to the right and pivot lever 70 in a clockwise direction about pin 71, which movement is transmitted through link 68 to lever 66 causing corresponding clockwise rotation of sleeve 19 to shift wheel 29 from the position shown in FIG. 4 to that shown in FIG. 7. Moreover, rotation of sleeve 38 through an angle of 90 degrees from the positions of either FIG. 4 or FIG. 7 causes collar 63 to shift to an intermediate position between FIGS. 4 and 7 to cause actuating arm 75 to shift wheel 29 to its vertical, transport position.

As the tractor moves toward the right in FIGS. 1 and 2 wheel 29 rides in the furrow of the trailing plow bottom 40R and is inclined such that it engages the furrow wall and is angled away from it. In this position, the wheel counteracts the side forces on the plow bottoms. When the end of the field is reached, cylinder 47 is actuated to rotate the frame 37 through an angle of 90 degrees such that the plow bottoms 40L and 40R project laterally from the implement and are held out of engagement with the ground. The resulting rotation of sleeve 38 acts through the mechanism 58 to cause sleeve 19 to rotate about draft frame member 6 until wheel 29 is vertical. This tilting action also causes spindle 24 to rotate about its longitudinal axis due to the movement of pinion 36 around pinion 35 to change the direction of the wheel with respect to the draft frame member 6.

As the tractor is then turned around to reverse the direction of plowing, the draft frame member 6 and the bracket 9 swing about the axis of spindle 15 causing a corresponding amount of rotation of control rod 31 within frame member 6, which rotation turns wheel 29 about the axis of spindle 24 so that the wheel 29 follows the tractor around the turn.

When the tractor direction has been reversed to make another pass across the field, the hydraulic actuator 47 is extended to move plow bottoms 40L into their operative positions opposite that shown in FIG. 1. As the frame 37 rotates through another angle of 90 degrees, the corresponding rotation of sleeve 38 on draft frame member 6 causes the tilting mechanism 58 on draft frame member 6 to tilt wheel 29 in the opposite direction from the position shown in FIG. 2 to counteract the side forces acting on plow bottoms 40L. The interaction of pinions 35 and 36 also causes the wheel to turn about the axis of spindle 24 to assume a position corresponding to that shown in FIG. 2.

In the embodiment illustrated in FIGS. 1 and 2, the draft frame member 6 extends angularly with respect to the direction of movement of the tractor to place the control rod 31 in direct connection with the ground support assembly 5 and forward connecting assembly 8. The angle of draft frame member 6 may be set, for example, at an angle of 6⅓ degrees with respect to the direction of draft with the wheel 29 angled at approximately 5⅔ degrees from the draft frame member in its furrow wheel position. The design of the wheel tilting mechanism 58 and configuration of eccentric 60 may be such that the wheel sleeve 19 rotates through 24 degrees when the sleeve 38 rotates through an angle of 180 degrees. The foregoing values are given by way of example only and are not to be construed in a limiting sense. The amount of tilt and angle change can be varied by changing the ratios between lever 70 and link 68 for example.

In the illustrated embodiment, the front pivotal axis of spindle 15 is in line with the center of resistance of the plow bottoms, the frame 37 supporting five sets of plow bottoms (three of which are visible in the broken sections). The center of resistance for the five plows in the illustrated embodiment is approximately one inch from the landside of the middle plow bottom. With the embodiments of FIGS. 1 and 2, the addition of a sixth plow bottom causes the front pull pivot at spindle 15 to shift approximately 3¼ inches to the right, and reduction to four plow bottom causes the pull pivot to shift approximately 3¼ inches to the left. The center of resistance shifts approximately 8 inches in either case so that the resulting offset is only approximately 4¾ inches which inconsequential in large size plows. Again, the preceding figures are given by way of example only, and being dependent upon variable factors such as the size and type of plow bottoms, are not to be construed in any limiting sense.

In the embodiment of FIGS. 8 through 10, parts corresponding to those of the previously described embodiments are identified by the same reference numerals. Draft frame member 6 in FIGS. 8 and 9 is disposed along the line of draft, or longitudinal axis of the tractor, and the ground support assembly 5 is mounted on an auxiliary frame tube 101 secured to beam 43. Rotatably mounted in tube 101 is a wheel control shaft 102 supported at its front in a bearing 103, and the beveled pinion 35 is fixed to the rear end of shaft 102. The wheel support arm 25 is secured to the lower end of a spindle 24' supported in a bracket and bearing assembly 20' which is rotatably mounted on control shaft 102 forwardly of pinion 35. Frame sleeve 38 and draft frame member 6 are connected with the auxiliary frame member 101 by a transverse arm 104 which is non-rotatably secured to auxiliary frame 101 and is rotatably connected with frame sleeve 38.

A sprocket 105 is fixed to the rear end of frame sleeve 38 and is connected by means of a chain 107 with a sprocket 106 fixed to the bracket and bearing assembly 20' such that rotation of the smaller sprocket 106 causes the wheel assembly 5 to tilt about the axis of control shaft 102. Mounted on the rear end of control rod 31 is a sprocket 108 connected through a chain 110 with a sprocket 109 fixed to control shaft 102. Consequently, rotation of rod 31 due to changes in the direction of the tractor with respect to the implement is transmitted through chain 110 and sprocket 109 to spindle 24' causing the wheel 29 to turn about the axis of spindle 24' to steer the rear end of the implement.

When the hydraulic actuator 47 is retracted from the position shown in FIG. 8, beam 43 and sleeve 38 are caused to rotate about the axis of draft frame member 6, which rotation in turn causes draft frame member 6 and beam 43 to swing about the axis of the auxiliary frame tube 101 in the direction of arrow a in FIG. 10. This movement in turn causes chain 107 to tilt the wheel assembly 5 from its inclined position of FIG. 8 to a vertical position as the transverse arm 104 reaches the vertical position indicated at 104a in FIG. 10. To reverse the direction of plowing, the hydraulic actuator 47 is extended from the position indicated schematically at 104a in FIG. 10 to cause the transverse arm 104 to move in the direction of arrow b to the position indicated at 104b in FIG. 10. This latter movement in turn causes chain 107 to tilt the wheel 29 to the position indicated at 29b in FIG. 10. Chain 110 steers wheel 129 in response to side to side swinging movement of draft frame member 6 about the front pivotal axis of spindle 15 as in the previous embodiment.

While both embodiments have been described in connection with reversible plows, it should be understood that the wheel tilting and steering arrangement is useful with any other tool in which lateral forces act on the tool during earthworking operations. Moreover, it should be understood that the invention is not limited to the exact construction and arrangement shown, but that various alternative and equivalents in the structure and arrangement will be apparent to those skilled in the art, all of which fall within the scope and spirit of the invention.

What is claimed is:

1. A multi-bottom turnover plowing implement of the semi-mounted type adapted to be drawn and controlled from a tractor having a power elevated hitch linkage and an auxiliary source of manually controlled power for operation of a remote actuator, comprising in combination a longitudinally extending frame having trunnion means forming a support for an oscillatable plow carrier, means at the forward end of the frame for attaching the implement to a tractor hitch linkage and including a vertical pivot and a transverse pivot, an oscillatable plow carrier mounted on the trunnion means, two arrays of plows of opposite hand fixed to the carrier, an actuator powered and controlled from the tractor and connected between the frame and the carrier to shift the carrier between either of two plowing positions and an intermediate transport position, means including a tail wheel to support the rear end of the frame at a fixed distance above the furrow made by the rearmost plow of either array, and at substantially the same distance above the ground when the carrier is in transport position, means forming a vertical pivot at the rear of the frame about which the tail wheel may oscillate, and an operative connection between the forward and rearward vertical pivots to maintain the tail wheel in predetermined planes of rotation relative to the directions of tractor travel, whereby the implement as a whole may be changed from a plowing mode to a transport mode by elevation of the tractor hitch linkage and by operation of the actuator without expenditure of the energy at the hitch linkage otherwise necessary to elevate the rear end of the frame relative to the tail wheel, and the implement will automatically turn to follow substantially in the path of the tractor which draws it and wherein there is provided a fore-and-aft pivotal support for the tail wheel and an operative connection between the carrier and the pivotal support to cause the tail wheel to tilt toward the furrow wall when the carrier is in either one of its plowing positions and to stand vertically when the carrier is in transport position.

2. A multi-bottom turnover plowing implement of the semi-mounted type adapted to be drawn and controlled from a tractor having a power elevated hitch linkage and an auxiliary source of manually controlled power for operation of a remote actuator, comprising in combination a longtudinally extending frame having trunnion means forming a support for an oscillatable plow carrier, means at the forward end of the frame for attaching the implement to a tractor hitch linkage and including a vertical pivot and a transverse pivot, on oscillatable plow carrier mounted on the trunnion means, two arrays of plows of opposite hand fixed to the carrier, an actuator powered and controlled from the tractor and connected between the frame and the carrier to shift the carrier between either of two plowing positions and an intermediate transport position, means including a tail wheel to support the rear end of the frame at a fixed distance above the furrow made by the rearmost plow of either array, and at substantially the same distance above the ground when the carrier is in transport position, means forming a vertical pivot at the rear of the frame about which the tail wheel may oscillate, and an operative connection between the forward and rearward vertical pivots to maintain the tail wheel in predetermined planes of rotation relative to the directions of tractor travel, whereby the implement as a whole may be changed from a plowing mode to a transport mode by elevation of the tractor hitch linkage and by operation of the actuator without expenditure of the energy at the hitch linkage otherwise necessary to elevate the rear end of the frame relative to the tail wheel, and the implement will automatically turn to follow substantially in the path of the tractor which draws it and wherein there is provided a fore-and-aft pivotal support for the tail wheel and an operative connection between the carrier and the pivotal support including an eccentric fastened to the carrier, a fulcrum fastened to the frame and a lever connected between the eccentric and the pivotal support.

3. A multi-bottom turnover plowing implement of the semi-mounted type adapted to be drawn and controlled from a tractor having a power elevated hitch linkage and an auxiliary source of manually controlled power for operation of a remote actuator, comprising in combination a longitudinally extending frame having trunnion means forming a support for an oscillatable plow carrier, means at the forward end of the frame for attaching the implement to a tractor hitch linkage and including a vertical pivot and a transverse pivot, an oscillatable plow carrier mounted on the trunnion means, two arrays of plows of opposite hand fixed to the carrier, an actuator powered and controlled from the tractor and connected between the frame and the carrier to shift the carrier between either of two plowing positions and an intermediate transport position, means including a tail wheel to support the rear end of the frame at a fixed distance above the furrow made by the rearmost plow of either array, and at substantially the same distance above the ground when the carrier is in transport position, means forming a vertical pivot at the rear of the frame about which the tail wheel may oscillate, and an operative connection between the forward and rearward vertical pivots to maintain the tail wheel in predetermined planes of rotation relative to the directions of tractor travel, whereby the implement as a whole may be changed from a plowing mode to a transport mode by elevation of the tractor hitch linkage and by operation of the actuator without expenditure of the energy at the hitch linkage otherwise necessary to elevate the rear end of the frame relative to the tail wheel, and the implement will automatically turn to follow substantially in the path of the tractor which draws it and wherein the means supporting the rear end of the frame is shiftable with respect to the frame so as to move the frame laterally with respect to the ground contact of the tail wheel between a left-most position for left hand plowing a center position for transport and a right-most position for right hand plowing and means for shifting the supporting means as the plow carrier is turned.

4. A multi-bottom turnover plowing implement of the semi-mounted type adapted to be drawn and controlled from a tractor having a power elevated hitch linkage and an auxiliary source of manually controlled power for operation of a remote actuator, comprising in combination a longitudinally extending frame having trunnion means forming a support for an oscillatable plow carrier, means at the forward end of the frame for attaching the implement to a tractor hitch linkage and including a vertical pivot and a transverse pivot, an oscillatable plow carrier mounted on the trunnion means, two arrays of plows of opposite hand fixed to the carrier, an actuator powered and controlled from the tractor and connected between the frame and the carrier to shift the carrier between either of two plowing positions and an intermediate transport position, means including a tail wheel to support the rear end of the frame at a fixed distance above the furrow made by the rearmost plow of either array, and at substantially the same distance above the ground when the carrier is in transport position, means forming a vertical pivot at the rear of the frame about which the tail wheel may oscillate, a first steering mechanism between the tail wheel and the hitch and connected to turn the tail wheel abouts its vertical axis in the opposite direction relative to the frame, from the direction which the frame turns about the vertical pivot at the forward end of the frame and a second steering mechanism between the plow carrier and the tail wheel and connected to turn the tail wheel about its vertical axis in response to shifting of said carrier between either of the two plowing positions and an intermediate transport position.

References Cited

UNITED STATES PATENTS

| | | | |
|---|---|---|---|
| 3,061,020 | 10/1962 | Mannheim | 172—285 |
| 1,151,622 | 8/1915 | Schulz | 172—285 X |
| 1,578,808 | 3/1926 | Neufang | 172—226 |
| 3,357,501 | 12/1967 | Watts | 172—212 X |
| 437,666 | 9/1890 | Sobey | 172—285 |
| 3,428,136 | 2/1969 | Johannsen et al. | 172—285 |

FOREIGN PATENTS

| | | |
|---|---|---|
| 686,364 | 1/1953 | Great Britain. |
| 275,319 | 5/1951 | Switzerland. |
| 911,190 | 5/1954 | Germany. |

ROBERT E. PULFREY, Primary Examiner

A. E. KOPECKI, Assistant Examiner

U.S. Cl. X.R.

172—223, 225, 285